Figure 1:
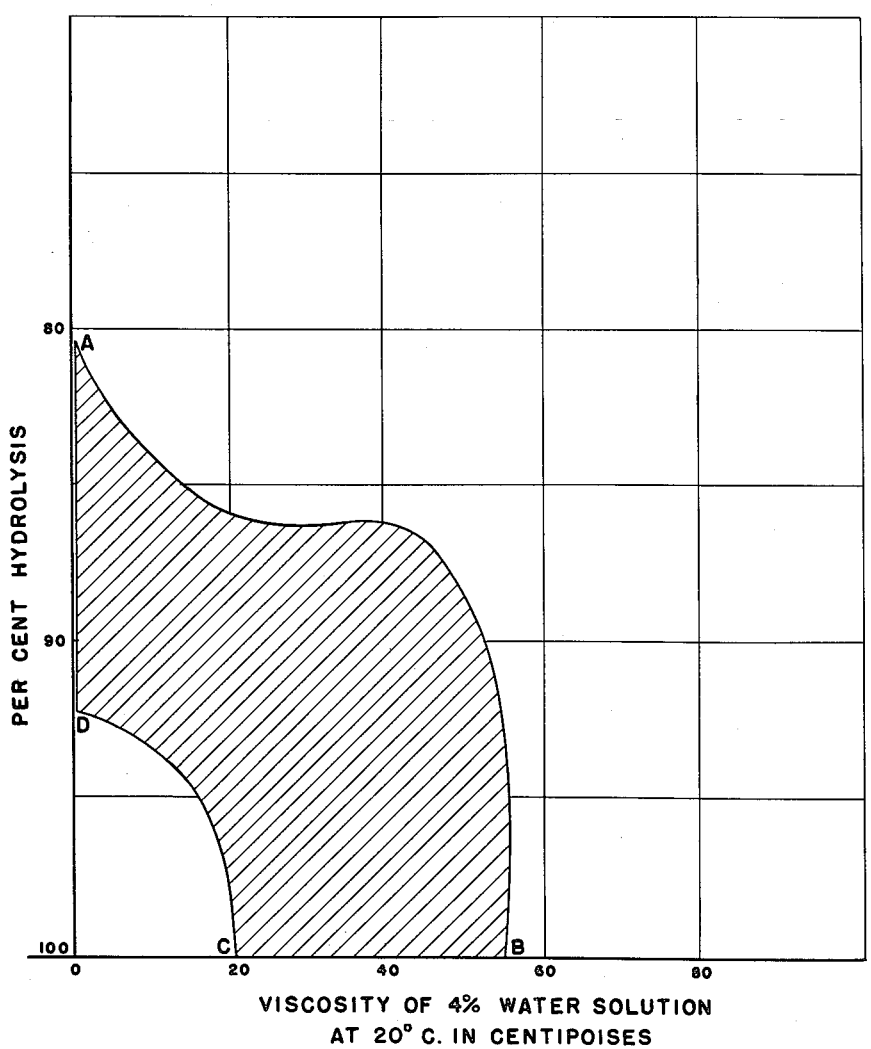

Jan. 30, 1962 W. L. DENMAN ETAL 3,019,195
METHOD AND COMPOSITION FOR TREATING COOLING WATER
Filed May 1, 1959 2 Sheets-Sheet 1

Inventors
Wayne L. Denman
Herman Kerst
by Hill, Sherman, Meroni, Gross & Simpson Attys.

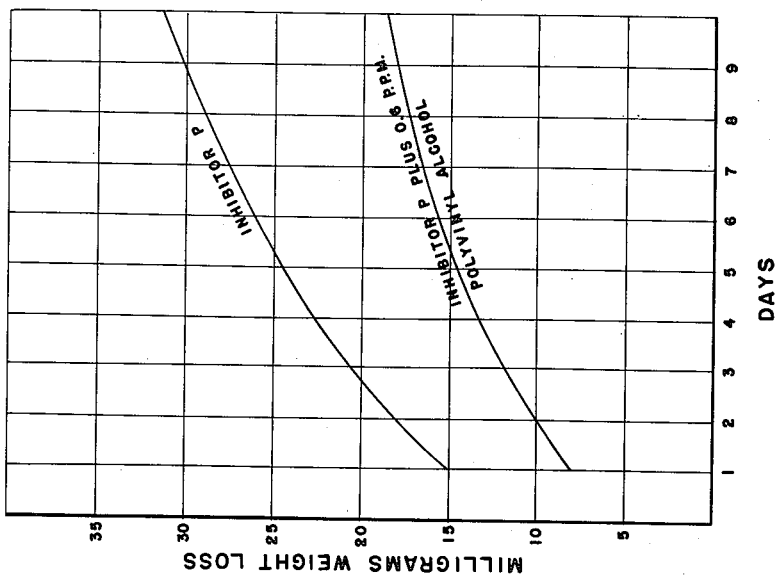
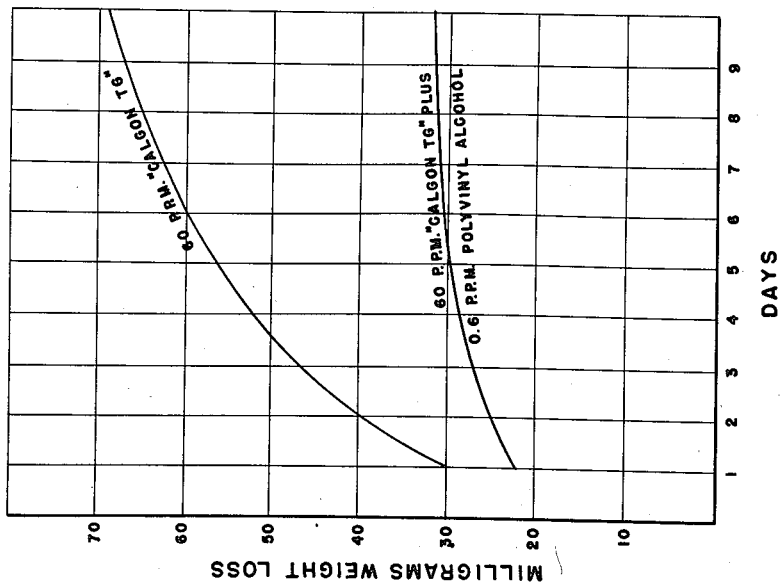

3,019,195
METHOD AND COMPOSITION FOR TREATING COOLING WATER

Wayne L. Denman, Oak Park, and Herman Kerst, Des Plaines, Ill., assignors to Dearborn Chemical Company, Chicago, Ill., a corporation of Illinois
Filed May 1, 1959, Ser. No. 810,471
17 Claims. (Cl. 252—389)

The present invention is directed to a method for treating cooling water and the like and to compositions which have been found to be particularly useful for that purpose.

The treatment of cooling water for various purposes is a problem which appears in many industries as well as railroad, marine, and industrial equipment which include condensers, heat exchangers, diesel engines, compressors, and air conditioning systems. The following problems may occur in varying degrees in each of these types of systems: control of scale deposits, corrosion of metals, biological growths, and attack on cooling tower wood.

The most common type of water formed deposit encountered in cooling water systems is calcium carbonate. It results from the breakdown of calcium bicarbonate naturally present in all raw waters. Calcium carbonate has a relatively low solubility, and this solubility decreases with increase in temperatures. In addition to the temperature factor, the solubility of calcium carbonate is also determined by the pH conditions maintained in the system, and the total minerals present.

Another deposit likely to be encountered in cooling water systems is calcium sulfate. In many cooling water installations, it is common practice to add sulfuric acid to the raw water to control scale deposits of calcium carbonate. Normally, sufficient acid is added to bring the pH of the water to the range of about 6 to 6.5. While the calcium sulfate which is produced by the reaction of the carbonate with sulfuric acid is much more soluble than the carbonate, it is entirely possible to exceed the solubility of calcium sulfate in the circulating cooling water and have that compound precipitated as a scale.

Calcium phosphate is also precipitated, particularly where improper treating methods are employed and high orthophosphate and calcium concentrations exist.

Iron containing deposits can result either from relatively high concentrations of iron being present in the raw water supply or by active corrosion taking place in the system.

Some water supplies also contain relatively large concentrations of silica which may result in the deposition of this material along the surfaces.

Wood surfaces of cooling towers are frequently presented with the problem of micro-organism growth. For example, algae and bacteria from the raw water and the air as well as fungi attach themselves to the wooden surfaces of the tower and result in the formation of a slime which in many instances poses as difficult a problem as scale deposits. The presence of slime interferes with normal heat transfer in heat exchangers as well as accelerates the rotting of the wood.

From the foregoing, it will be appreciated that the problems associated with cooling water treatment are complex and varied. While many different types of treating agents have been added to cooling water to overcome one or more of the problems mentioned, no single composition, to our knowledge, has been effective to remove existing slime and scale as well as inhibit metallic corrosion and minimize further deposition of scale and slime on the cooling tower surfaces. The provision of such compositions is one of the principal objects of the present invention.

Another object of the present invention is to provide a method for improving the corrosion inhibiting effect of commercially available corrosion inhibitors.

Still another object of the invention is to provide a method for treating circulating water systems with a combination of ingredients in which the combination has substantially greater corrosion inhibiting effectiveness and scale preventing effectiveness than any of the individual components of the combination.

A further object of the invention is to provide an improved dry mixture for treating circulating water systems.

Another object of the invention is to provide a composition for treating circulating water systems which can be operated effectively at higher pH values than are presently employed for the more conventional corrosion inhibiting compositions.

In accordance with the present invention, surfaces which are subject to corrosion and scale deposition from contact with an aqueous liquid are treated with a combination of a polyphosphate and a polyvinyl alcohol. Additional benefits are achieved if a chromate corrosion inhibitor is added to the composition, as will be apparent from the specific data found in a succeeding portion of this description.

The relative concentration of each of the ingredients can be varied within reasonably wide limits. Generally however, it is necessary to have a polyphosphate concentration of at least five parts per million (calculated as metaphosphate) in the circulating system, and preferably from ten to twenty parts per million of the polyphosphate. The concentration of polyvinyl alcohol may extend upwardly from a minimum of 0.1 part per million and is preferably from 0.5 to 5 parts per million. At concentrations in excess of about five parts per million, no additional benefit seems to be derived from greater amounts of the polyvinyl alcohol, and excessive amounts of this material may actually introduce a foaming problem. The chromate concentration in the circulating system should be kept at a minimum of at least ten parts per million and preferably is in the range of twenty to sixty parts per million.

The compositions are preferably made up dry for dissolution in the systems to be treated. For such compositions, the polyphosphate content should be in the range from about ⅓ to 3 times the chromate content, and from 1 to 100 times the polyvinyl alcohol content.

Our tests have shown that at equal pH levels, the addition of the polyvinyl alcohol reduces (1) the overall corrosion rate of metallic surfaces, (2) the initial corrosion rate, (3) the instantaneous corrosion rate, determined by the slope of the curve plotting the weight loss of the specimen against time, at the end of the test, (4) the frequency and severity of local attack and pitting, (5) the amount of inorganic scale formed and (6) the amount of slime formation which would otherwise occur.

The polyvinyl alcohols are useful with polyphosphates alone, particularly in "once-through" treatment systems for scale control alone. Such systems employ a residual phosphate concentration of about 1–10 p.m.m. and the polyvinyl alcohol should be added in an amount of at least 0.5 p.p.m.

Combinations of polyphosphate and chromate inhibitors have been employed for some time in the reduction of corrosion of metallic surfaces. While such combinations are quite effective, they do not completely curtail corrosion, nor are they always effective in preventing the deposition of certain types of inorganic scale. Furthermore, they seem to have no appreciable effect upon the deposition of organic slimes, particularly on wood surfaces. The addition of the small amount of certain polyvinyl alcohols according to this invention, however, substantially improves the corrosion inhibiting effectiveness of the phosphate-chromate combination and has the additional benefit of eliminating inorganic scale deposits sometimes occurring in phosphate-chromate treating systems, and the further advantage of eliminating or preventing the deposition of organic slimes. The effect of such polyvinyl alcohols is quite remarkable when it is considered that the use of the same polyvinyl alcohols by themselves at the dosage levels here specified have substantially no corrosion inhibiting effectiveness.

A further description of the present invention will be made in conjunction with the attached sheets of drawings in which:

FIGURE 1 is a plot indicating the usable range of polyvinyl alcohols for the purpose of this invention based upon their degree of hydrolysis and the viscosity of a 4% water solution of the polyvinyl alcohol at 20° C.;

FIGURE 2 is a plot comparing the effectiveness of a polyphosphate inhibitor alone with the same polyphosphate inhibitor to which a polyvinyl alcohol has been added, the plot comparing milligrams weight loss of a coupon against the time in days; and FIGURE 3 is a plot comparing the corrosion inhibiting effectiveness of a standard polyphosphate-chromate inhibitor with and without the addition of a polyvinyl alcohol, and plots the weight loss against time.

As shown on the drawings:

FIGURE 1 is a plot identifying the characteristics of the polyvinyl alcohols which find utility in the process of the present invention. Polyvinyl alcohols are available commercially in many different forms each having a characteristic percent hydrolysis and a characteristic viscosity. The area included within the lines ABCDA delineates those materials which, by test, have been shown to improve the scale inhibiting effectiveness of a polyphosphate medium containing 10 parts per million polyphosphate, at a concentration of one part per million of the polyvinyl alcohol. The test was run by feeding water containing 20 parts per million orthophosphate ion at a pH of 8.5 through a stainless steel coil immersed in boiling water. A calcium phosphate scale was formed in the coil. After a given quantity of water had passed through the coil, the scale was dissolved out with acid and the amount of calcium was determined. The effect of the various polyvinyl alcohols was determined by comparison with blank runs. The duration of each test was about four hours.

The following table lists commercially available polyvinyl alcohols and their characteristics found to be suitable in reducing the amount of scale deposit beyond that obtained by the use of the polyphosphate ions alone:

Table I

| Polyvinyl Alcohol | Percent Hydrolysis | Viscosity of 4% Solution at 20° C., Centipoises | Percent Scale, Compared to Scale Deposit Occurring With 10 p.p.m. Polyphosphate Alone |
|---|---|---|---|
| Elvanol 51-05 | 88 | <5 | 68 |
| Elvanol 50-42 | 87.5 | 40 | 68 |
| Elvanol 71-30 | 99 | 30 | 43 |
| Elvanol 71-24 | 98 | 25 | 79 |
| Elvanol 72-51 | 98 | 50 | 70 |
| Vinol FH-400 | 99 | 30 | 68 |
| Vinol FH-500 | 99 | 42 | 91 |
| Gelvatol 1-60 | 99 | 30 | 64 |

The polyphosphate constituent of the composition may be a molecularly dehydrated monovalent or combined mono- and poly-valent metal phosphate. Particularly good results are obtained by employing alkali metal phosphates having a ratio of alkali oxide to phosphorous pentoxide ranging from about 0.4 to 1 to about 2 to 1. Phosphates which fall within this class include compounds such as sodium septaphosphate, tetrasodium pyrophosphate, sodium tripolyphosphate, sodium tetraphosphate, sodium hexametaphosphate, and sodium decaphosphate.

In addition to the alkali metal phosphates, the polymetallic glassy phosphates such as sodium-zinc polyphosphate also find use in the present invention. Typical formulae for several of these compounds are indicated below:

Table II $8Na_2O \cdot 8P_2O_5 \cdot ZnO$
$8Na_2O \cdot 8P_2O_5 \cdot MgO$
$8Na_2O \cdot 8P_2O_5 \cdot MnO_2$
$16Na_2O \cdot 16P_2O_5 \cdot MnO_2 \cdot MgO$
$24Na_2O \cdot 24P_2O_5 \cdot MnO_2 \cdot MgO \cdot ZnO$ Some improvement in corrosion inhibiting effectiveness may also be achieved by employing a molecularly dehydrated polyphosphate in combination not only with chromates or dichromates but also with ferrocyanide ions, and in further combination with metallic cations such as zinc, cobalt, cerium, chromium, manganese, cadmium, lead, tin and nickel. In addition, the corrosion inhibiting effectiveness of phosphate compounds in some instances can be increased by mixing such phosphates with cupric chloride.

The chromates which are useful for the purpose of this invention include various water-soluble metallic chromates and dichromates such as sodium chromate, potassium chromate, and zinc dichromate or mixtures thereof.

The chrome-glucosates (a glucose molecule with four substituent chromate radicals) may also be employed for the purposes of the invention.

FIGURE 2 consists of a plot comparing the results obtained on a simulated cooling tower test comparing the corrosion inhibiting effectiveness of sodium hexametaphosphate containing about 7.2% zinc (Calgon TG) alone and with 0.6 part per million "Elvanol 71-30" added. In this test, water was circulated through a stainless steel pail and a Pyrex coupon chamber. The temperature was controlled at about 130° F. by an electric immersion heater and thermo-regulator. Makeup treatment agents are pumped continuously through the system and the overflow goes to waste. The test coupons of steel are suspended in the flowing water and their weight loss is determined. The duration of each test was ten days, and the pH was 7.5.

From this test, it will be apparent that the addition of the polyvinyl alcohol very substantially improves the corrosion inhibiting effectiveness of the polyphosphate. This improvement occurs at the beginning of the test since the absolute amount of corrosion is reduced, and continues throughout the period of this test. It will be noted that the slope of the curve obtained on the test involving the use of the polyvinyl alcohol flattens out to a considerably greater degree, so that the incremental corrosion before the end of the test period is extremely small.

FIGURE 3 compares the corrosion inhibiting effectiveness, on a pilot cooling tower scale, between a standard corrosion inhibitor consisting of 30 parts per million of a sodium polyphosphate containing about 67% $P_2O_5$ with 20 parts per million of sodium chromate with and without the addition of 0.6 part per million of a polyvinyl alcohol (Elvanol 51-05). Tests were made in a small force-draft cooling tower having a 13 gallon per minute pumping rate. The water passes through a heat exchanger and is heated with steam. The total solids in the tower are controlled by continuous blowdown and makeup. The treating agents and the acid are fed continuously, the pH being maintained at a value of 6.5. The temperature in the tower was 130° F. The low carbon steel coupons are suspended in the circulating water, and their weight loss measured. The scale is dissolved out of the system at the end of a run and analyzed. The duration of each test was ten days.

The following table compares the corrosion inhibiting effectiveness of various compositions of the present invention with the effectiveness of the inhibitor alone, and the results obtained with no inhibitor whatever present. In some examples, a polyacrylate dispersing agent was employed in the amounts stated.

Table III

| | Composition | Dose, p.p.m. | pH | Penetration, mils/yr. Initial | Penetration, mils/yr. Final | Final Slope, mg./day | Grams Ca Scale, as Ca |
|---|---|---|---|---|---|---|---|
| (1) | Blank | | 7.5 | 60 | 27 | 60 | 90 |
| (2) | Inhibitor P: Sodium polyphosphates, sodium chromate | 30 / 20 | 7.5 | 8 | 1.1 | 0.2 | 70 |
| (3) | Inhibitor P¹ plus "Elvanol 51-05" | 2 | 7.5 | 7 | 0.8 | 0 | 54 |
| (4) | Inhibitor P¹ plus "Elvanol 51-05," DSC-1005 (polyacrylate resin) | 0.5 / 2.5 | 7.5 | 5.2 | 0.6 | 0 | 42 |
| (5) | Inhibitor P¹ plus "Elvanol 51-05," DSC-1005 | 0.25 / 1.25 | 7.0 | 6.4 | 0.8 | 0 | 44 |
| (6) | Inhibitor P¹ | | 6.5 | 12 | 2.2 | 1.4 | 40 |
| (7) | Inhibitor P¹ plus "Elvanol 51-05," DSC-1005 | 0.25 / 1.25 | 6.5 | 5.6 | 1.3 | 0.4 | 36 |
| (8) | Inhibitor P¹ plus "Elvanol 51-05" | 0.6 | 6.5 | 6.5 | 1.3 | 0.4 | 28 |
| (9) | Inhibitor P¹ plus "Elvanol 51-05" | 2 | 6.5 | 6.3 | 1.6 | 0.7 | 30 |

¹ At dosage level inidicated in (2).

It will be evident that various modifications can be made to the described embodiments without departing from the scope of the present invention.

We claim as our invention:

1. The method of treating surfaces subject to scale formation from contact with an aqueous liquid which comprises introducing into said liquid a polyphosphate in sufficient amount to provide a concentration of at least 5 parts per million in said liquid, adding to said liquid a polyvinyl alcohol whose percent hydrolysis and viscosity relation is contained within the curve bounded by the lines ABCDA of FIGURE 1, in amounts of at least 0.1 part per million of said liquid, and thereafter flowing the liquid past said surfaces.

2. The method of treating surfaces subject to corrosion and scale formation from contact with an aqueous liquid which comprises introducing into said liquid a polyphosphate in sufficient amount to provide a concentration of at least 5 parts per million in said liquid, adding to said liquid a polyvinyl alcohol whose percent hydrolysis and viscosity relation is contained within the curve bounded by the lines ABCDA of FIGURE 1, in amounts from 0.5 to 5 parts per million of said liquid and thereafter flowing the liquid past said surfaces.

3. The method of treating surfaces subject to corrosion and scale formation from contact with an aqueous liquid which comprises introducing into said liquid a polyphosphate in sufficient amount to provide a concentration of from 5 to 50 parts per million in said liquid, adding to said liquid a polyvinyl alcohol whose percent hydrolysis and viscosity relation is contained within the curve bounded by the lines ABCDA of FIGURE 1, in amounts of at least 0.1 part per million of said liquid, and thereafter flowing the liquid past said surfaces.

4. The method of treating surfaces subject to corrosion and scale formation from contact with an aqueous liquid which comprises introducing into said liquid a polyphosphate in sufficient amount to provide a concentration of from 5 to 50 parts per million in said liquid, adding to said liquid a polyvinyl alcohol whose percent hydrolysis and viscosity relation is contained within the curve bounded by the lines ABCDA of FIGURE 1, in amounts of from 0.5 to 5 parts per million of said liquid, and thereafter flowing the liquid past said surfaces.

5. The method of treating surfaces subject to corrosion and scale formation from contact with an aqueous liquid which comprises introducing into said liquid a polyphosphate in sufficient amount to provide a concentration of at least 5 parts per million in said liquid, adding a chromate to said liquid in an amount sufficient to provide a chromate concentration of at least 10 parts per million, and adding to said liquid a polyvinyl alcohol whose percent hydrolysis and viscosity relation is contained within the curve bounded by lines ABCDA of FIGURE 1, in amounts of at least 0.1 part per million of said liquid, and thereafter flowing the liquid past said surfaces.

6. The method of treating surfaces subject to corrosion and scale formation from contact with an aqueous liquid which comprises introducing into said liquid a polyphosphate in sufficient amount to provide a concentration of at least 5 parts per million in said liquid, adding a chromate to said liquid in an amount sufficient to provide a chromate concentration in the range from 20 to 60 parts per million, and adding to said liquid a polyvinyl alcohol whose percent hydrolysis and viscosity relation is contained within the curve bounded by lines ABCDA of FIGURE 1, in amounts of at least 0.1 part per million of said liquid, and thereafter flowing the liquid past said surfaces.

7. The method of treating surfaces subject to corrosion and scale formation from contact with an aqueous liquid which comprises introducing into said liquid a polyphosphate in sufficient amount to provide a concentration in the range from 5 to 50 parts per million in said liquid, adding a chromate to said liquid in an amount sufficient to provide a chromate concentration of from 20 to 60 parts per million, and adding to said liquid a polyvinyl alcohol whose percent hydrolysis and viscosity relation is contained within the curve bounded by lines ABCDA of FIGURE 1, in amounts of from 0.5 to 5.0 parts per million of said liquid, and thereafter flowing the liquid past said surfaces.

8. A composition for treating circulating water systems, comprising a dry mixture of a polyphosphate scale inhibitor and a polyvinyl alcohol having a percent hydrolysis and viscosity relation contained within the curve bounded by the lines ABCDA of FIGURE 1.

9. A composition for treating circulating water systems comprising a dry mixture of a polyphosphate scale inhibitor, a chromate corrosion inhibitor, and a polyvinyl alcohol having a percent hydrolysis and viscosity relation contained within the curve bounded by the lines ABCDA of FIGURE 1.

10. A composition for treating circulating water systems comprising a dry mixture of a polyphosphate scale inhibitor, a chromate corrosion inhibitor, and a polyvinyl alcohol having a percent hydrolysis and viscosity relation contained within the curve bounded by the lines ABCDA of FIGURE 1, the polyphosphate content being in the range from ⅓ to 3 times the chromate content, and from 1 to 100 times the polyvinyl alcohol content.

11. The method of treating surfaces subject to corrosion and scale formation from a circulating aqueous liquid which comprises introducing into said liquid a water soluble polyphosphate in sufficient amount to provide a concentration of at least 5 parts per million in said liquid, adding a water soluble chromate in an amount sufficient to provide a chromate concentration of at least 10 parts per million, adding to said liquid ions of a metal selected from the group consisting of zinc, cobalt, cerium, chromium, manganese, cadmium, lead, tin, and nickel, adding to said liquid a polyvinyl alcohol whose percent hydrolysis and viscosity relation is contained within the curve bounded by the lines ABCDA of FIGURE 1, in amounts of at least 0.1 part per million but insufficient to cause appreciable foaming, and thereafter flowing the liquid past said surfaces.

12. The method of claim 11 in which said ions are zinc ions.

13. The method of treating surfaces subject to corrosion and scale formation from a circulating aqueous liquid which comprises introducing into said liquid a water soluble polyvalent metal polymetallic glassy phosphate in sufficient amount to provide a concentration of at least 5 parts per million in said liquid, adding a water soluble chromate in an amount sufficient to provide a chromate concentration of at least 10 parts per million, adding a polyvinyl alcohol whose percent hydrolysis and viscosity relation is contained within the curve bounded by the lines ABCDA of FIGURE 1, in amounts of at least 0.1 part per million but insufficient to cause appreciable foaming, and thereafter flowing the liquid past said surfaces.

14. The method of claim 13 in which said polyvalent metal polymetallic glassy phosphate is a zinc sodium polyphosphate.

15. A composition for treating circulating water systems comprising a dry mixture of a water soluble polyphosphate, a water soluble chromate, a water soluble zinc compound, and a polyvinyl alcohol having a percent hydrolysis and viscosity relation contained within the curve bounded by the lines ABCDA of FIGURE 1.

16. The method of treating an aqueous system for the control of scale which comprises adding to said system an amount of a water soluble polyphosphate sufficient to provide a residual phosphate concentration of from 1 to 10 parts per million, and adding to said system a polyvinyl alcohol having a percent hydrolysis and viscosity relation contained within the curve bounded by the lines ABCDA of FIGURE 1.

17. A composition for tretaing circulating water systems comprising a mixture of a water soluble phosphate, a water soluble ferrocyanide, and a polyvinyl alcohol having a percent hydrolysis and viscosity relation contained within the curve bounded by the lines ABCDA of FIGURE 1.

References Cited in the file of this patent

UNITED STATES PATENTS

| | | |
|---|---|---|
| 19,719 | Hall | Oct. 8, 1935 |
| 2,299,748 | Hatch | Oct. 27, 1942 |
| 2,515,529 | Ryznar et al. | July 18, 1950 |
| 2,877,085 | George et al. | Mar. 10, 1959 |
| 2,900,222 | Kahler et al. | Aug. 18, 1959 |

FOREIGN PATENTS

| | | |
|---|---|---|
| 559,240 | Germany | Sept. 16, 1932 |

OTHER REFERENCES

C and E News, March 21, 1949, pp. 840–843.